Feb. 5, 1935.  H. STEINHART ET AL  1,990,053
HAND TOOL
Filed Jan. 23, 1933
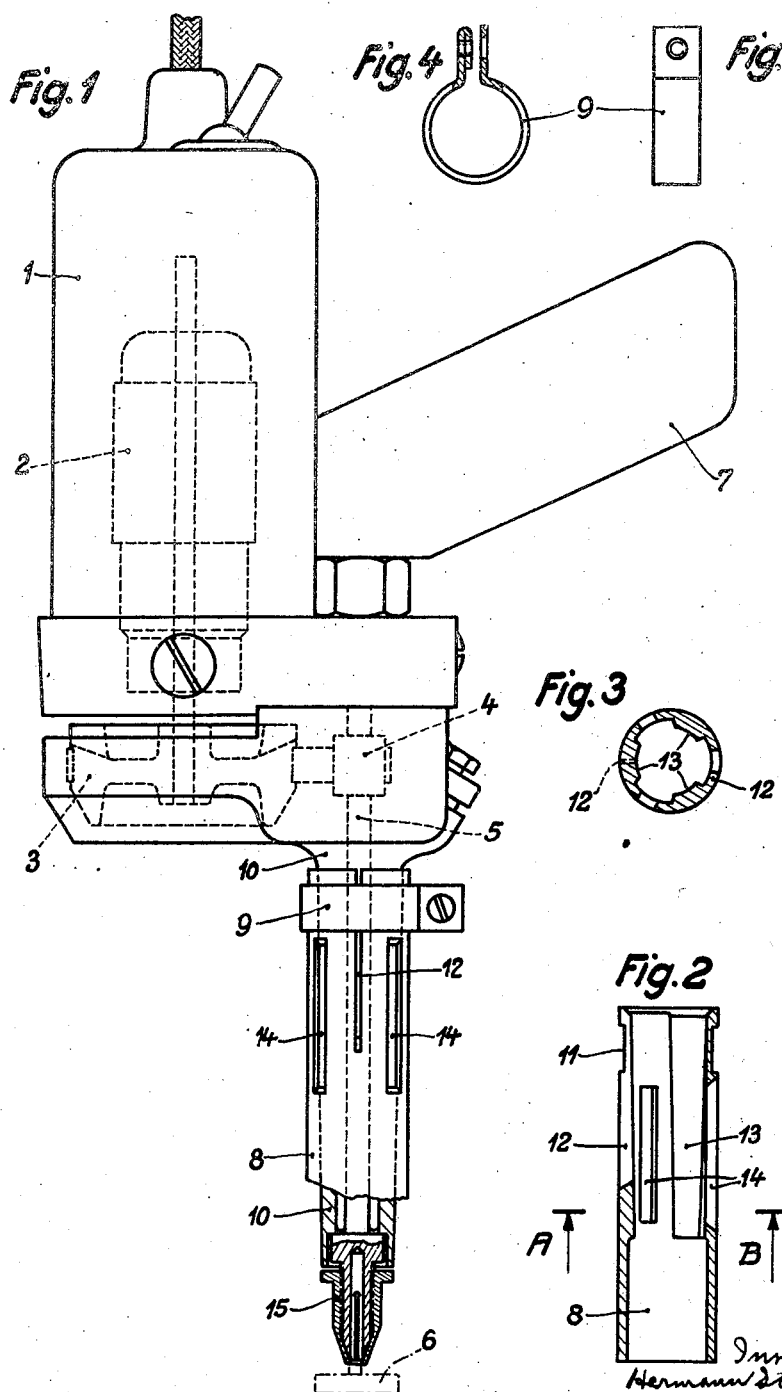
Inventors
Hermann Steinhart
Franz Kratz
Ernst Baumgratz
by Stewart-McKay
their attorneys Patented Feb. 5, 1935

1,990,053

UNITED STATES PATENT OFFICE 1,990,053

HAND TOOL

Hermann Steinhart, Franz Kratz, and Ernst Baumgratz, Stuttgart, Germany, assignors to Robert Bosch Aktiengesellschaft, Stuttgart, Germany Application January 23, 1933, Serial No. 653,210
In Germany January 23, 1932

9 Claims. (Cl. 51—170)

The present invention relates to hand tools having an in-built motor, and more especially electrically driven hand grinding machines.

The object of the invention is to provide an improved holding device for the purpose of enabling a more certain guiding of the tool when grinding.

In a known electric hand grinding machine, the diameter and weight of the motor are kept so small that, in operation, the hand grinding machine can be conveniently held with one hand. In this case, the appliance can be either directly grasped by the hand, or a handle like the butt end of a pistol can be employed for holding purposes, this handle being connected to the grinding machine as a prolongation of the tool spindle.

With specially small work, and such work as requires particularly exact treatment, this handle is situated too far from the grinding tool to permit an exact guidance of the hand grinding machine.

According to the invention, therefore, this hand grinding machine is supplemented by a sleeve-like holding device of insulating material being inserted over the driving members (grinding spindle, clamping chuck and spindle bearing) projecting from the casing of the same, in order to enable the hand grinding machine to be held and guided close to the grinder.

An example of construction of the invention is shown in the accompanying drawing, in which:—

Figure 1 is an elevation of an electric hand grinding machine, fitted with a tubular grip or handle.

Figure 2 is a longitudinal section through the grip or handle-sleeve.

Figure 3 a section through the sleeve on the line A—B of Figure 2.

Figure 4 is the front view of a clamping band.

Figure 5 an end view of the clamping band shown in Figure 4.

An electric motor 2 of usual construction (shown in broken lines in the drawing) is arranged in the casing 1 of an electric hand grinding machine. The shaft of this motor carries a belt pulley 3, which by means of a belt drives a belt pulley 4, which is connected with the driving spindle 5 for a grinder 6. The spindle 5 is mounted in a bearing 10, which projects partly from the casing 1 of the hand grinding machine. It carries, on its part projecting from the spindle bearing, a clamping chuck 15 for receiving the grinder 6. On the rearward extension of the driving spindle 5 a handle 7 is connected to the casing 1, which handle has the form of a pistol butt, and enables the grinding machine to be conveniently handled.

A sleeve 8 of insulating material is inserted over the driving parts (grinding spindle, clamping chuck, spindle bearing) projecting from the casing 1 of the machine, and is secured by a clamping band 9 to the grinding spindle bearing 10. The clamping band 9 embraces the sleeve 8 in an annular groove 11. The sleeve 8 is provided with an open longitudinal slit 12 on the side nearest the casing 1, which gives springiness to the sleeve at its clamped end. On its inside the sleeve is turned out conical, and to such an extent that the sleeve seats itself on the outer face, which is also conical, of the grinding spindle bearing 10. On this conical inner part of the sleeve longitudinally extending ribs 13 are formed. In this way a good seating of the sleeve 8 on the grinding spindle 10 is obtained, even if the two conical faces should not be made to fit exactly. Furthermore, the sleeve has slots 14 in its periphery for the passage of air for cooling the grinding spindle bearing.

When specially small objects have to be dealt with, or those which require particularly exact treatment, the grinding machine is held, not by the handle 7, but by the grip-sleeve 8. Owing to the small distance between the grinder and the grip-sleeve, a secure guiding of the hand guiding machine is thereby attained, whilst contact with rotating parts (15) of the machine is impossible. As the sleeve of insulating material does not conduct heat, it can be safely held even during the considerable heating of the spindle bearing which occurs at high speeds.

If desired, the sleeve may, for example, also be provided with several slits at its fastening end. In this case, the clamping band could be dispensed with, and the sleeve secured in a simple manner by merely pushing it on to the conical part of the grinding spindle bearing.

In case the sleeve-shaped holding device becomes too warm in working, a second sleeve, preferably of heat-insulating material, may be inserted thereon, which entirely or partly covers the first sleeve.

We declare that what we claim is:—

1. A hand tool comprising a casing having an apertured bearing neck projecting therefrom, a motor in said casing, a spindle driven by said motor and extending from within said casing through said bearing neck and outwardly of said casing to an unconfined outer end, a tool clamp at the outer end of said spindle and a sleeve extending from said bearing neck outwardly of said casing in non-supporting relation with said spindle as a cover thereover and forming a hand grip for guiding the tool, said sleeve being formed of electrically-insulating and low-heat-conductivity material and being slit at its end adjacent the bearing neck in a manner imparting resilience to the sleeve and enabling the sleeve to engage upon and remain in position on the bearing neck by virtue of its resilience.

2. An electrically driven hand tool designed for fine grinding and the like work requiring delicate hand guidance of the work element of the tool comprising a casing, an electric motor in said casing, an apertured bearing neck projecting from said casing, a spindle driven by said motor and extending from within said casing through said apertured bearing neck and outwardly of said casing to an unconfined outer end, a tool clamp on said outer end of said spindle, and a tubular element of electrically-insulating and low-heat-conductivity material detachably secured at one end about said bearing neck adjacent to but forwardly spaced from said casing and extending out of bearing contact or connection with said spindle as a cover thereover to form a hand grip between said casing and the outer end of said spindle for guiding the tool, said bearing neck having such a stylus-like formation and said tubular element being so attached thereto as to adapt the tool to be so gripped by the thumb and fingers of one hand at points on said tubular element that the portion of the bearing neck to the rear of said tubular element may be cradled in the notch between the thumb and forefinger after the manner of the customary grip of a writer on a pencil.

3. An electrically driven hand tool designed for fine grinding and the like work requiring delicate hand guidance of the work element of the tool comprising a casing, an electric motor in said casing, an apertured bearing neck projecting from said casing in a manner to dispose the axis of its aperture parallel to but laterally offset from the axis of said motor, a spindle driven by said motor and extending from within said casing through said apertured bearing neck and outwardly of said casing to an unconfined outer end, a tool clamp on said outer end of said spindle, and a tubular element of insulating material having a low heat conductivity detachably secured at one end about said bearing neck adjacent to but forwardly spaced from said casing and extending out of bearing contact or connection with said spindle as a cover thereof to close proximity to said outer end of said spindle to form a hand grip for guiding the tool, said bearing neck having such a stylus-like formation and off-set relation with said casing and said tubular element being so attached to said bearing neck as to adapt the tool to be gripped by the hand of the operator at points on the bearing neck rearwardly of the forward end of the casing below the motor therein in the working portion of the tool and on the tubular element closely adjacent the tool clamp.

4. An electrically driven hand tool comprising a casing, an electric motor in said casing, an elongated spindle-bearing bracket rigidly secured to said casing to extend forwardly therefrom and having a longitudinal bore and an outer boundary surface circular in cross-section, a spindle journaled in the bore of said bearing bracket and having an inner end portion operatively connected with said motor for the driving of said spindle and an outer free end extending beyond said bearing bracket, a tool clamp on said outer end of said spindle, and a sleeve element having longitudinally extending ribs on its inner wall surrounding said bracket and engaging said outer boundary surface of said bracket only along said ribs and ventilating slots through its walls intermediate said ribs, said sleeve element forming a hand grip between said casing and the outer end of said spindle for guiding the tool.

5. A hand tool as defined in claim 4 and further characterized by said bearing bracket having its outer surface tapered toward the free end of the bracket and said longitudinally extending ribs of said sleeve being formed on a complementary taper.

6. An electrically-driven hand tool designed for fine grinding and the like work requiring delicate hand guidance of the work element of the tool comprising a casing, an electric motor in said casing, an elongated spindle bearing mounted on the forward-end portion of said casing to extend forwardly therefrom in parallel relation to but offset from the axis of said motor and formed with a shoulder at its end adjacent said casing adapted to be gripped by one hand of the operator in a manner to dispose the motor above said spindle bearing in the working position of the tool, a spindle driven by said motor and extending through said bearing to an unconfined end beyond the forward end of said bearing, a tool clamp on said outer end of said spindle, and a sleeve of electrically-insulating and low-heat-conductivity material formed as a hand grip detachably mounted on said spindle bearing forwardly adjacent said shoulder and extending therefrom out of contact with said spindle about said spindle bearing to a free end closely adjacent the tool clamp on said spindle.

7. An electrically driven hand tool designed for fine grinding and the like work requiring delicate hand guidance of the work element of the tool comprising a casing, an electric motor in said casing, an apertured bearing neck of stylus-like formation projecting forwardly from the front portion of said casing and laterally offset from the motor therein, a spindle driven by said motor and extending through said bearing neck forwardly of said casing to an unconfined outer end, a tool clamp on said outer end of said spindle, a tubular element of electrically-insulating and low-heat-conductivity material detachably secured at one end about said bearing neck adjacent to but forwardly spaced from said casing and extending out of bearing contact or connection with said spindle as a cover thereover to form a hand grip between said casing and the outer end of said spindle, and a handle of pistol-butt type attached to said casing in line with and to the rear of said bearing neck, said bearing neck, tubular element thereon and handle being so formed and cooperatively arranged all on one side of the axis of said motor as to adapt the tool to be gripped for support and guidance thereof by the hands of a single operator simultaneously at points on said tubular element closely adjacent the tool clamp, on said bearing neck rearwardly of said tubular element and on said handle rearwardly of said bearing neck.

8. An electrically-driven hand tool comprising a casing, an electric motor in said casing, an elongated spindle-bearing bracket rigidly secured to said casing to extend forwardly therefrom and having a longitudinal bore and an outer boundary surface circular in cross-section and tapering toward its outer free end, a spindle journaled in the bore of said bearing bracket and having an inner-end portion operatively connected with said motor for driving the same and an outer end terminating forwardly adjacent the outer end of said bracket, a tool clamp on the outer end of said spindle, and a sleeve element detachably secured to said spindle-bearing bracket with its rear end forwardly adjacent said casing and its forward end rearwardly adjacent the outer end of said spindle, said sleeve element having a cylindrical interior of uniform cross-section except for interior ribs longitudinally extending from its rear end a distance short of its forward end and formed with a taper complementary to the taper of said spindle-bearing bracket so as to engage said bracket only along said ribs.

9. An electrically-driven hand tool as defined in claim 8 and in which the portion of said sleeve having said ribs on its interior is also formed with ventilating slots through its walls intermediate said ribs.

HERMANN STEINHART.
FRANZ KRATZ.
ERNST BAUMGRATZ.